United States Patent [19]

Ouwerkerk et al.

[11] Patent Number: 5,422,538
[45] Date of Patent: Jun. 6, 1995

[54] LOW-PRESSURE MERCURY DISCHARGE LAMP

[75] Inventors: Martin Ouwerkerk; Dagobert M. De Leeuw; Cornelis A. H. A. Mutsaers; Godefridus P. J. Geelen, all of Eindhoven, Netherlands

[73] Assignee: U.S. Philips Corporation, New York, N.Y.

[21] Appl. No.: 299,025

[22] Filed: Aug. 31, 1994

Related U.S. Application Data

[63] Continuation of Ser. No. 953, Jan. 5, 1993, abandoned.

[30] Foreign Application Priority Data

Jan. 7, 1992 [EP] European Pat. Off. ............ 92200029

[51] Int. Cl.$^6$ .............................................. H01J 1/62
[52] U.S. Cl. .................................. 313/486; 313/485; 313/487
[58] Field of Search .............. 313/485, 486, 487, 109; 149/18; 250/484.1, 327.2

[56] References Cited

U.S. PATENT DOCUMENTS

| | | | |
|---|---|---|---|
| 3,748,517 | 7/1973 | Haft | 313/109 |
| 3,772,099 | 11/1973 | Ryan | 149/18 |
| 3,875,453 | 4/1975 | Thornton, Jr. | 313/487 |
| 4,047,069 | 9/1977 | Akutsu | 313/487 |
| 4,602,188 | 7/1986 | de Hair | 313/487 |
| 4,800,319 | 1/1989 | Van Kemenade | 313/487 |
| 4,835,398 | 5/1989 | Nakamura | 250/484.1 |
| 5,055,681 | 10/1991 | Tsuchino | 250/327.2 |

FOREIGN PATENT DOCUMENTS

| | | |
|---|---|---|
| 0114441 | 8/1984 | European Pat. Off. . |
| 0124175 | 11/1984 | European Pat. Off. . |

OTHER PUBLICATIONS

Lawrence E. Tannas, Jr., Flat Panel Displays and CRTs, 1985, p. 66.
"Method of Measuring and Specifying Colour Rendering Properties of Light Sources" IEC Publication No. 13.2 (TC-3.2) 1974.
"Official Recommendations of the International Commission on Illumination" IEC Publication No. 15 (E.1.3.1), 1971, & 2 Supplements.
"Color Temperature: A Problem of Standards" J. Rennilson, Optical Spectra, Oct. 1980, pp. 63–66.
Bulletin of the Academy of Sciences of the U.S.S.R. Physical Series vol. 38, No. 1, 1974.

*Primary Examiner*—Anita Pellman Gross
*Assistant Examiner*—Walter Malinowski
*Attorney, Agent, or Firm*—Ernestine C. Bartlett

[57] ABSTRACT

The invention relates to a low-pressure mercury discharge lamp with a very good color rendering and with a color point ($x_L$, $y_L$ on or adjacent the Planckian locus, provided with a gastight, radiation-transmitting envelope which contains mercury and rare gas, and provided with a luminescent layer which comprises
  a first luminescent material activated by bivalent europium having an emission mainly in the blue region of the visible portion of the spectrum,
  a second luminescent material activated by bivalent manganese and having at least an emission band mainly in the red region of the visible spectrum and
  a third luminescent material having an emission mainly in the yellow region of the visible spectrum.

According to the invention, the third luminescent material is defined by the formula $$Sr_{(2-x-y)}M_xSiO_4:Eu^{+2}{}_y,$$

in which $0,0005 \leq y \leq 0,05$, M being barium and/or calcium and $0,01 \leq x \leq 0,1$.

23 Claims, No Drawings

LOW-PRESSURE MERCURY DISCHARGE LAMP

This is a continuation application Ser. No. 08/000,953, filed Jan. 5, 1993, now abandoned.

FIELD OF THE INVENTION

The invention relates to a low-pressure mercury discharge lamp with a very good color rendering and with a color point $(x_L, y_L)$ on or adjacent the Planckian locus, provided with a gastight, radiation-transmitting envelope which contains mercury and rare gas, and provided with a luminescent layer which comprises a first luminescent material activated by bivalent europium having an emission mainly in the blue region of the visible portion of the spectrum, a second luminescent material activated by bivalent manganese and having at least an emission band mainly in the red region of the visible spectrum and a third luminescent material having an emission mainly in the yellow region of the visible spectrum.

BACKGROUND OF THE INVENTION

The expression "a very good color rendering" in the present description and claims is understood to mean that the general color rendering index R(a,8) (mean of the color rendering indices of eight test colours as defined by the Commission Internatinale d'Eclairage: IEC Publication No. 13.2 (TC-3.2), 1974) has a value of at least 90.

The color of visible radiation is characterized by the color coordinates (x, y) which define the color point in the color triangle (see IEC Publication No. 15 (E-1.3.1), 1971). Low-pressure mercury discharge lamps for general lighting purposes should emit light which can be designated as "white". White radiation is found in the color triangle at color points situated on the Planckian locus. This locus, also called black body line and designated hereinafter as curve P, contains the color points of the radiation emitted by a perfect blackbody at different temperatures (the so-called color temperature). A given color temperature is assigned not only to a given point on curve P, but also to radiation having color coordinates situated on a line which intersects the curve P in that point (see the said IEC Publication No. 15). If this radiation has a color point close to the curve P, this radiation is also regarded as white light with this given color temperature. In the present description and claims, the expression "a color point close to the curve P" is understood to mean that the distance from the color point to the point on the curve P with the same color temperature is at most 20 MPCD. MPCD (minimum perceptible color difference) is the unit of color difference, see the publication by J. J. Rennilson in Optical Spectra, October 1980, p. 63. In addition to requirements to be imposed on the luminescent layer regarding the color temperature of the light radiated by the low-pressure mercury discharge lamp and the color rendering, it is also necessary for the luminescent layer to comprise substances having a small short-term luminous decrement (i.e., the luminescent materials suffer no or only little damage from irradiation with short-wave ultraviolet radiation, especially 185 nm radiation).

Low-pressure mercury discharge lamps which radiate white light and have a very good color rendering are known from European Patents EP-A-0114441 and EP-A-0124175. Calcium halophosphate activated by antimony and/or manganese is often used as the third luminescent material. It is found in practice that the requirements as to the color of the light radiated by the low-pressure mercury discharge lamp and as to color rendering can only be complied with in the known low-pressure mercury discharge lamp in combination with a comparatively low luminous efficacy of the low-pressure mercury discharge lamp.

SUMMARY OF THE INVENTION

The invention has for its object inter alia to provide a low-pressure mercury discharge lamp whose radiated light is white, whose color rendering is very good, while at the same time the luminous efficacy of the low-pressure mercury discharge lamp is comparatively high.

A low-pressure mercury discharge lamp according to the invention is for this purpose characterized in that the third luminescent material is defined by the formula

$$Sr_{(2-x-y)}M_xSiO_4:Eu^{+2}{}_y,$$

in which $0.0005 \leq y \leq 0.05$, M is barium and/or calcium, and $0.01 \leq x \leq 0.1$.

It was found that a low-pressure mercury discharge lamp according to the invention has favorable properties as regards the color point of the light radiated by the low-pressure mercury discharge lamp, the luminous efficacy, and the luminous decrement of the luminescent layer both at high and at low loads. By high load is meant here that the power consumed by the low-pressure mercury discharge lamp in the discharge column is more than 500 W per m² surface area of the luminescent layer. The color rendering of a low-pressure mercury discharge lamp according to the invention is also very good, while the luminous efficacy is comparatively high. A further advantage of a low-pressure mercury discharge lamp according to the invention as compared with the known low-pressure mercury discharge lamp is the possibility of considerably reducing the quantity of luminescent material in the luminescent layer of the low-pressure mercury discharge lamp. In the known low-pressure mercury discharge lamp, the comparatively great average diameter of the halophosphate particles impose a bottom limit on the quantity of luminescent material with which an even coating of the wall of the low-pressure mercury discharge lamp can be achieved. The average particle diameter of $Sr_{(2-x-y)}M_xSiO_4:Eu^{+2}{}_y$, referred to hereinafter as OSE, however, may be chosen to be considerably smaller than that of calcium halophosphate.

It should be noted that materials with the basic lattice MeSiO$_4$, in which Me is mainly Sr and in addition thereto Ca or Ba, activated by bivalent europium are known per se as luminescent materials from Bull. Ac. Sci. USSR 38 (1974) 41. This document, however, does not refer to the use of these luminescent materials in a low-pressure mercury discharge lamp with a very good color rendering.

When y has a value lower than 0.0005, the luminescent layer has a too low absorption of the excitant radiation, so that insufficient luminous flux values are obtained for practical purposes. For values of y greater than 0.05 concentration quenching occurs to such an extent that insufficient luminous flux values are also obtained. Such compositions of OSE are accordingly unsuitable for use in a low-pressure mercury discharge lamp according to the invention.

The luminescent material $Sr_{(2-y)}SiO_4:Eu^{+2}{}_y$ (x=0) has a monoclinic lattice and an emission band mainly in the green portion of the visible spectrum with a maximum emission at a wavelength of 547 nm. If part of the $Sr^{+2}$ ions in the lattice is replaced with $Ca^{+2}$ ions or $Ba^{+2}$ ions, however, this crystal lattice is orthorhombic and the wavelength at which the emission band reaches this maximum depends on the $Ca^{+2}$ or $Ba^{+2}$ ion content (x). It was found that x must be greater than 0.01 for achieving a good stabilization of the orthorhombic crystal lattice of the luminescent material OSE. If x is also chosen to be smaller than 0.1, the position of the emission band is such that this composition of OSE is highly suitable for use in a low-pressure mercury discharge lamp according to the invention.

In a preferred embodiment of a low-pressure mercury discharge lamp according to the invention, y is chosen to lie between 0.015 and 0.025. With this content of the activator $Eu^{+2}$ in the third luminescent material, a good quantum efficiency (number of photons of visible light radiated by the luminescent material per ultraviolet photon absorbed) was found. When the activator content is increased, the sensitivity of the luminescent material to oxidation increases strongly, which adversely affects the processability of the luminescent material.

In another preferred embodiment of a low-pressure mercury discharge lamp according to the invention, x is chosen to lie between 0.01 and 0.03. As was stated above, it is desirable for a good stabilization of the orthorhombic crystal lattice that x is greater than 0.01. If x is also chosen to be smaller than 0.03, the maximum of the emission band lies at a wavelength of approximately 570 nm. This position of the emission band leads to an excellent color rendering when the luminescent material is used as the third luminescent material in a low-pressure mercury discharge lamp according to the invention.

With known low-pressure mecury discharge lamps having a very good color rendering and a comparatively low color temperature ($\leq 3000$ K) of the light radiated by the low-pressure mercury discharge lamp, it is often found to be necessary to include a fourth, and possibly even a fifth component in the luminescent layer in order to realize the comparatively low color temperature. Such a further component in the luminescent layer may, for example, absorb part of the blue light generated in the plasma of the low-pressure mercury discharge lamp, so that a lower color temperature is achieved. Often, however, the further components of the luminescent layer are materials which are very difficult to homogenize with the first components of the luminescent layer. This leads in practice to a lamp manufacturing process which is difficult to control. Since the luminescent material OSE absorbs blue light, it was found to be possible to manufacture low-pressure mercury discharge lamps according to the invention with a comparatively low color temperature in which the luminescent layer comprises only three luminescent materials. The drawbacks mentioned above can thus be avoided.

It was found to be advantageous to use strontium aluminate (SAE) or barium aluminate (BAE) activated by bivalent europium as the first luminescent material in a low-pressure mercury discharge lamp according to the invention. It was also found to be advantageous to use cerium-magnesium pentaborate (CBM) activated by bivalent manganese and trivalent gadolinium as the second luminescent material. For some applications it is desirable that the cerium-magnesium pentaborate is furthermore activated by terbium (CBTM), so that the second luminescent material has not only an emission band mainly in the red region of the visible spectrum but also an emission band mainly in the green region of the visible spectrum. By using suitably chosen combinations of these first and second luminescent materials, it was found to be possible to manufacture low-pressure mercury discharge lamps according to the invention over a very wide range of color temperatures of the light radiated by the low-pressure mercury discharge lamp, while the luminescent layer comprised no further components than the first, the second, and the third luminescent material.

DETAILED DESCRIPTION OF PREFERRED EMBODIMENT

Embodiments of the invention will be explained in more detail with reference to a Table.

Table I shows the luminous efficacy ($\eta$) in lumens/Watt and the general color rendering index R(a,8) as a function of the color temperature of the light radiated by the low-pressure mercury discharge lamp for both known low-pressure mercury discharge lamps and low-pressure mercury discharge lamps according to the invention. /29,/35, and /54 refer to either calcium halophosphate activated by antimony and manganese or a mixture of antimony-activated calcium halophosphate and calcium halophosphate activated by antimony and manganese. The different numbers refer to different compositions. MZS is manganese-activated zinc silicate; YAG is cerium-activated yttrium-aluminum garnet and HB is antimony-activated calcium halophosphate. BAM is barium-magnesium aluminate activated by bivalent europium. All other components of the luminescent layers listed in Table I have already been described above.

It can be seen that the luminescent layer of the known low-pressure mercury discharge lamp with a color temperature of 2700 K (third row of Table I) is put together from five components. The luminescent layers of the low-pressure mercury discharge lamps according to the invention with the same color temperature (first two rows of Table I), however, comprise only three components, so that the manufacturing process of these low-pressure mercury discharge lamps will be much better controllable. It can also be seen that the low-pressure mercury discharge lamps according to the invention have a better luminous efficacy and in addition an improved color rendering, even when CBTM is replaced by the cheaper CBM.

The luminescent layer of the known low-pressure mercury discharge lamp with a color temperature of 3000 K (sixth row of Table I) is put together from four components. Since the luminescent layers of the low-pressure mercury discharge lamps according to the invention with a color temperature of 3000 K (fourth and fifth rows of Table I) comprise only three components, these low-pressure mercury discharge lamps also have the advantages of a better controllable lamp manufacturing process and a higher luminous efficacy compared with the known low-pressure mercury discharge lamp with a color temperature of 3000 K.

If the color temperature of the low-pressure mercury discharge lamp is 3800 K, both the luminescent layer of the low-pressure mercury discharge lamps according to the invention (seventh and eighth rows of Table I) and the luminescent layer of the known low-pressure mercury discharge lamp (ninth row of Table I) comprise three components. The low-pressure mercury discharge lamps according to the invention have an improved luminous efficacy while color rendering remains the same as compared with the known low-pressure mercury discharge lamp, both when the luminescent layer comprises CBTM and when the luminescent layer comprises CBM.

The luminescent layer of the known low-pressure mercury discharge lamp with a color temperature of 5000 K (twelfth row of Table D comprises four components. It can be seen that low-pressure discharge lamps according to the invention with a color temperature of 5000 K, whose luminescent layer comprises only three components (tenth and eleventh rows of Table D have a higher luminous efficacy than the known low-pressure discharge lamp, but at the same time a slightly lower general color rendering index. If a very high value of the general color rendering index is desired, this can be achieved in that a suitable fourth component is added to the luminescent layer of the low-pressure discharge lamp according to the invention. This fourth component is BAM in both examples given in the Table (thirteenth and fourteenth rows of Table I). These examples illustrate that the addition of a fourth component not only causes the luminous efficacy of a low-pressure discharge lamp according to the invention to increase further, but that also the value of the general color rendering index corresponds to that of the known low-pressure discharge lamp.

The final two rows of Table I refer to low-pressure discharge lamps according to the invention with the very high color temperature of 6500 K. It can be seen that the use of OSE in the luminescent layer renders it possible to manufacture low-pressure discharge lamps with a very high luminous efficacy, a very good color rendering, and a very high color temperature.

TABLE I

| Colour Temperature | Composition of luminescent layer | η(lm/W) | R(a,8) |
| --- | --- | --- | --- |
| 2700 K. | SAE CBTM OSE | 67 | 94 |
|  | SAE CBM OSE | 65 | 94 |
|  | SAE MZS CBTM /29 YAG* | 63 | 92 |
| 3000 K. | BAE CBTM OSE | 68 | 95 |
|  | BAE CBM OSE | 67 | 95 |
|  | SAE CBTM /29 YAG* | 63 | 94 |
| 3800 K. | BAE CBTM OSE | 67 | 95 |
|  | BAE CBM OSE | 66 | 95 |
|  | SAE CBTM /35* | 64 | 95 |
| 5000 K. | BAE CBTM OSE | 67 | 93 |
|  | BAE CBM OSE | 66 | 93 |
|  | HB SAE CBTM /54* | 64 | 96 |
|  | BAM BAE CBTM OSE | 72 | 97 |
|  | BAM BAE CBM OSE | 68 | 95 |
| 6500 K. | BAM BAE CBTM OSE | 71 | 93 |
|  | BAM BAE CBM OSE | 70 | 92 |

*: Not according to the invention, for comparison.

We claim:

1. A low-pressure mercury discharge lamp with a color rendering index R(a,8) of at least 90, with minimal short-term luminous decrement, with a color point ($x_L$, $y_L$) on or adjacent the Planckian locus, and with a luminous efficacy of at least 65 lm/W, provided with a gastight, radiation-transmitting envelope which contains mercury and rare gas, and provided with a luminescent layer which comprises a first luminescent material activated by bivalent europium having an emission mainly in the blue region of the visible portion of the spectrum, a second luminescent material activated by bivalent manganese and having at least an emission band mainly in the red region of the visible spectrum, and a third luminescent material having an emission mainly in the yellowish region of the visible spectrum, wherein the third luminescent material is defined by the formula $$Sr_{(2-x-y)}M_xSiO_4: Eu^{+2}{}_y$$

in which $0.0005 \leq y \leq 0.05$, M is barium and/or calcium, and $0.01 \leq x \leq 0.1$.

2. A low-pressure mercury discharge lamp as claimed in claim 1, wherein $0.015 \leq y \leq 0.025$.

3. A low-pressure mercury discharge lamp as claimed in claim 2 wherein $0.01 \leq x \leq 0.03$.

4. A low-pressure mercury discharge lamp as claimed in claim 2 wherein the luminescent layer comprises no further luminescent materials besides the said three luminescent materials.

5. A low-pressure mercury discharge lamp as claimed in claim 2 wherein the first luminescent material comprises strontium aluminate activated by bivalent europium.

6. A low-pressure mercury discharge lamp as claimed in claim 2 wherein the first luminescent material comprises barium aluminate activated by bivalent europium.

7. A low-pressure mercury discharge lamp as claimed in claim 2 wherein the second luminescent material comprises cerium-magnesium pentaborate activated by bivalent manganese and trivalent gadolinium.

8. A low-pressure mercury discharge lamp as claimed in claim 1, wherein $0.01 \leq x \leq 0.03$.

9. A low-pressure mercury discharge lamp as claimed in claim 8 wherein the luminescent layer comprises no further luminescent materials besides the said three luminescent materials.

10. A low-pressure mercury discharge lamp as claimed in claim 8 wherein the first luminescent material comprises strontium aluminate activated by bivalent europium.

11. A low-pressure mercury discharge lamp as claimed in claim 8 wherein the first luminescent material comprises barium aluminate activated by bivalent europium.

12. A low-pressure mercury discharge lamp as claimed in claim 8 wherein the second luminescent material comprises cerium-magnesium pentaborate activated by bivalent manganese and trivalent gadolinium.

13. A low-pressure mercury discharge lamp as claimed in claim 1, wherein the luminescent layer comprises no further luminescent materials besides the said three luminescent materials.

14. A low-pressure mercury discharge lamp as claimed in claim 13 wherein the first luminescent material comprises strontium aluminate activated by bivalent europium.

15. A low-pressure mercury discharge lamp as claimed in claim 13 wherein the first luminescent material comprises barium aluminate activated by bivalent europium.

16. A low-pressure mercury discharge lamp as claimed in claim 13 wherein the second luminescent material comprises cerium-magnesium pentaborate activated by bivalent manganese and trivalent gadolinium.

17. A low-pressure mercury discharge lamp as claimed in claim 1 wherein the first luminescent material comprises strontium aluminate activated by bivalent europium.

18. A low-pressure mercury discharge lamp as claimed in claim 17 wherein the first luminescent material comprises barium aluminate activated by bivalent europium.

19. A low-pressure mercury discharge lamp as claimed in claim 17 wherein the second luminescent material comprises cerium-magnesium pentaborate activated by bivalent manganese and trivalent gadolinium.

20. A low-pressure mercury discharge lamp as claimed in claim 1 wherein the first luminescent material comprises barium aluminate activated by bivalent europium.

21. A low-pressure mercury discharge lamp as claimed in claim 20 wherein the second luminescent material comprises cerium-magnesium pentaborate activated by bivalent manganese and trivalent gadolinium.

22. A low-pressure mercury discharge lamp as claimed in claim 1 wherein the second luminescent material comprises cerium-magnesium pentaborate activated by bivalent manganese and trivalent gadolinium.

23. A low-pressure mercury discharge lamp as claimed in claim 22, wherein the cerium-magnesium pentaborate is in addition activated by trivalent terbium.

* * * * *